(12) United States Patent
Wu et al.

(10) Patent No.: US 8,285,550 B2
(45) Date of Patent: Oct. 9, 2012

(54) METHOD AND SYSTEM FOR GENERATING DIALOGUE MANAGERS WITH DIVERSIFIED DIALOGUE ACTS

(75) Inventors: Hsu-Chih Wu, Yilan County (TW); Ching-Hsien Lee, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 1050 days.

(21) Appl. No.: 12/206,752

(22) Filed: Sep. 9, 2008

(65) Prior Publication Data

US 2010/0063823 A1 Mar. 11, 2010

(51) Int. Cl.
*G10L 15/18* (2006.01)
*G10L 21/00* (2006.01)
*G06F 17/00* (2006.01)
*G06F 3/048* (2006.01)
*G06F 17/21* (2006.01)

(52) U.S. Cl. ....... 704/270; 704/10; 704/257; 704/270.1; 704/275; 463/35; 715/751; 715/767

(58) Field of Classification Search .................. None
See application file for complete search history.

(56) References Cited

U.S. PATENT DOCUMENTS

| 5,694,558 | A | 12/1997 | Sparks et al. | |
|---|---|---|---|---|
| 6,311,159 | B1 * | 10/2001 | Van Tichelen et al. | 704/275 |
| 6,510,411 | B1 * | 1/2003 | Norton et al. | 704/254 |
| 6,823,313 | B1 * | 11/2004 | Yuchimiuk et al. | 704/275 |
| 6,941,266 | B1 * | 9/2005 | Gorin et al. | 704/257 |
| 7,003,459 | B1 * | 2/2006 | Gorin et al. | 704/240 |
| 7,024,348 | B1 | 4/2006 | Scholz et al. | |
| 7,127,395 | B1 * | 10/2006 | Gorin et al. | 704/257 |
| 7,158,935 | B1 * | 1/2007 | Gorin et al. | 704/257 |
| 7,167,832 | B2 | 1/2007 | Abella et al. | |
| 7,373,300 | B1 * | 5/2008 | Bangalore et al. | 704/270.1 |
| 7,440,893 | B1 * | 10/2008 | Gorin et al. | 704/240 |
| 7,472,060 | B1 * | 12/2008 | Gorin et al. | 704/240 |
| 7,487,088 | B1 * | 2/2009 | Gorin et al. | 704/240 |

(Continued)

FOREIGN PATENT DOCUMENTS

TW 200837717 9/2008

OTHER PUBLICATIONS

Hurtado et al., "A Statistical USer Simulatio Technique for the Improvement of a Spoken Dialog System", CIARP 2007, pp. 743-752, 2007.*

(Continued)

*Primary Examiner* — Justin Rider
(74) *Attorney, Agent, or Firm* — Jianq Chyun IP Office

(57) ABSTRACT

A method to generate dialogue manager (DM) is provided, in which a plurality DMs with the same purpose but having different dialogue acts is automatically generated according to a DM designed by a designer. An automatic aiding tool facilitates the design of a dialogue flow and the adjustment of DM rules, and also helps a system designer to find out potential problems in the original DM. The method adopts the current DM combined with a user simulation technique and further employs a specially designed scoring function, so as to automatically generate a plurality of new DMs. The new DMs achieve the same dialogue purpose as the original DM, but differ from the original DM in system acts and responses during the dialogue process. The dialogue flow of the dialogue system is enhanced, and meanwhile, the design and improvement of the DM are also accelerated.

18 Claims, 18 Drawing Sheets

U.S. PATENT DOCUMENTS

| | | | |
|---|---|---|---|
| 7,529,667 B1 * | 5/2009 | Gorin et al. | 704/240 |
| 7,702,508 B2 * | 4/2010 | Bennett | 704/257 |
| 7,729,904 B2 * | 6/2010 | Bennett | 704/215 |
| 2002/0135618 A1 * | 9/2002 | Maes et al. | 345/767 |
| 2003/0028498 A1 * | 2/2003 | Hayes-Roth | 706/17 |
| 2003/0137537 A1 * | 7/2003 | Guo et al. | 345/751 |
| 2003/0144055 A1 * | 7/2003 | Guo et al. | 463/35 |
| 2004/0162724 A1 * | 8/2004 | Hill et al. | 704/231 |
| 2005/0105712 A1 * | 5/2005 | Williams et al. | 379/265.02 |
| 2006/0080107 A1 * | 4/2006 | Hill et al. | 704/275 |
| 2008/0033724 A1 * | 2/2008 | Block et al. | 704/257 |

OTHER PUBLICATIONS

"Notice of Allowance of Taiwan Counterpart Application", issued on Jun. 14, 2012, p. 1-p. 4, in which the listed reference was cited.

* cited by examiner

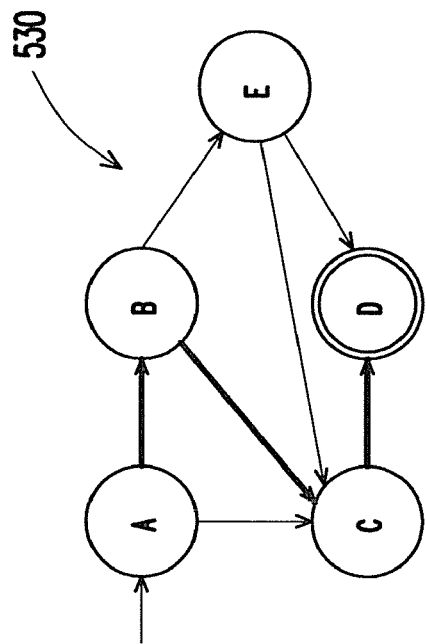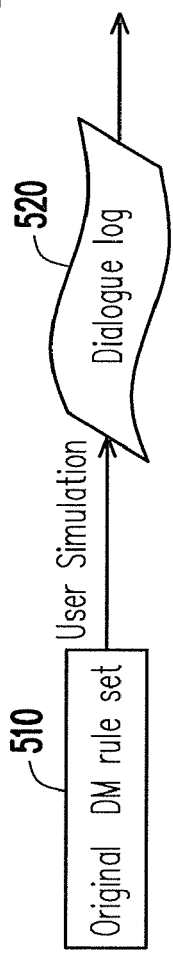
FIG. 5A
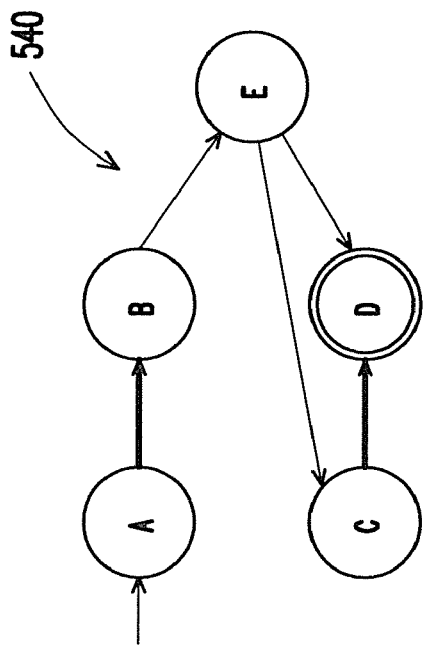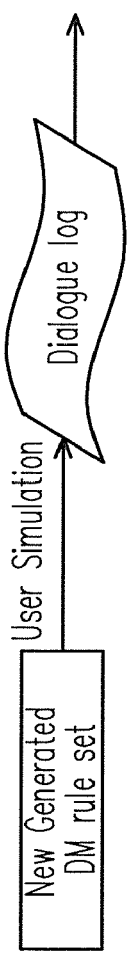
FIG. 5B

Dialogue Example

User 1: Do you like playing baseball?
User 2: No, I don't!
User 1: What are you going to do on Friday?
User 2: No plan yet.
User 1: Would you like to dance?
User 2: Dance is fine, but I prefer playing tennis or football, watching TV, and going to the cinema.
User 1: How about playing football on Monday afternoon?
User 2: Great!
User 1: Ok! Let's play football on Monday afternoon.
User 2: See you then.

FIG. 8A

Example DM rules

--> initialize_simuser
:action understand & :truth_value not --> rephrase_question
:speech_act "confirm" --> close_off
:speech_act "close_off" | :is_final "1" --> close_off
:meta_clause "good_bye" | :is_final "1" --> close_off
:speech_act "close_off" --> close_off
:initial_question --> initial_question
:topic "paraphrase_failed" --> apologize_not_understood
:action repeat --> repeat_response
:speech_act "state_dislike" & !:activity --> record_negative_reaction
:speech_act "propose_activity" | :key ":temporal" --> merge_key_from_previous_dialogue_state
:speech_act %"clarifier" & :temporal --> merge_dialogue_state_from_history
:speech_act %"state" | :speech_act %"affirm" | :speech_act %"clarifier" --> apply_inheritance
:speech_act "state_busy" & !:activity | :question "what are you doing" --> ask_simple_question
:my_proposition "accept" & :action "join" --> close_off
:speech_act "affirm_okay" --> invite_on_user_schedule
:speech_act %"prefer" --> evaluate_preferred_event
:speech_act "affirm_yes" & :my_proposition "invite" | :search_key ":activity" --> finalize_joint_event

FIG. 9

Example DM rules~ actions

--> initialize_simuser
:action understand & :truth_value not --> rephrase_question
:speech_act "confirm" --> close_off
:speech_act "close_off" | :is_final "1" --> close_off
:meta_clause "good_bye" | :is_final "1" --> close_off
:speech_act "close_off" --> initial_question
:initial_question --> initial_question
:topic "paraphrase_failed" --> apologize_not_understood
:action repeat --> repeat_response
:speech_act "state_dislike" & !:activity --> record_negative_reaction
:speech_act "propose_activity" | :key ":temporal" --> merge_key_from_previous_dialogue_state
:speech_act %"clarifier" & :temporal --> merge_dialogue_state_from_history
:speech_act %"state" | :speech_act %"affirm" | :speech_act %"clarifier" --> apply_inheritance
:speech_act "state_busy" & !:activity | :question "what are you doing" --> ask_simple_question
:my_proposition "accept" & :action "join" --> close_off
:speech_act "affirm_okay" --> invite_on_user_schedule
:speech_act %"prefer" --> evaluate_preferred_event
:speech_act "affirm_yes" & :my_proposition "invite" | :search_key ":activity" --> finalize_joint_event

FIG. 10

Example DM rules~ speech acts

--> initialize_simuser

:action understand & :truth_value not --> rephrase_question

:speech_act "confirm" --> close_off

:speech_act "close_off" | :is_final "1" --> close_off

:meta_clause "good_bye" | :is_final "1" --> close_off

:speech_act "close_off" --> close_off

:initial_question --> initial_question

:topic "paraphrase_failed" --> apologize_not_understood

:action repeat --> repeat_response

:speech_act "state_dislike" & !:activity --> record_negative_reaction

:speech_act "propose_activity" | :key ":temporal" --> merge_key_from_previous_dialogue_state :speech_act %"clarifier" & :temporal --> merge_dialogue_state_from_history :speech_act %"state" | :speech_act %"affirm" | :speech_act %"clarifier" --> apply_inheritance :speech_act "state_busy" & !:activity | :question "what are you doing" --> ask_simple_question :my_proposition "accept" & :action "join" --> close_off :speech_act "affirm_okay" --> invite_on_user_schedule :speech_act %"prefer" --> evaluate_preferred_event :speech_act "affirm_yes" & :my_proposition "invite" | :search_key ":activity" --> finalize_joint_event

FIG. 11

Example DM rules~ other variables

--> initialize_simuser

:action_understand & :truth_value_not --> rephrase_question

:speech_act "confirm" --> close_off

:speech_act "close_off" | :is_final "1" --> close_off

:meta_clause "good_bye" | :is_final "1" --> close_off

:speech_act "close_off" --> close_off

:initial_question --> initial_question

:topic "paraphrase_failed" --> apologize_not_understood

:action_repeat --> repeat_response

:speech_act "state_dislike" & [:activity] --> record_negative_reaction

:speech_act "propose_activity" | :key ":temporal" --> merge_key_from_previous_dialogue_state :speech_act %"clarifier" & [:temporal] --> merge_dialogue_state_from_history :speech_act %"state" | :speech_act %"affirm" | :speech_act %"clarifier" --> apply_inheritance :speech_act "state_busy" & [:activity] | :question "what are you doing" --> ask_simple_question :my_proposition "accept" & :action "join" --> close_off :speech_act "affirm_okay" --> invite_on_user_schedule :speech_act %"prefer" --> evaluate_preferred_event :speech_act "affirm_yes" & [:my_proposition "invite" | :search_key ":activity"] --> finalize_joint_event

FIG. 12

Newly-generated DM

--> initialize_simuser
:action understand & :truth_value not --> rephrase_question
:speech_act "confirm" --> close_off
:speech_act "close_off" | :is_final "1" --> close_off
:meta_clause | :is_final --> close_off
:speech_act "close_off" --> close_off
:initial_question --> initial_question
:topic "paraphrase_failed" --> apologize_not_understood
:action repeat --> repeat_response
:speech_act "state_dislike" & !:activity --> record_negative_reaction
:speech_act "propose_activity" | :key "temporal" --> merge_key_from_previous_dialogue_state
:speech_act %"clarifier" & :temporal --> merge_dialogue_state_from_history
:speech_act %"affirm" | :speech_act %"clarifier" --> apply_inheritance
:speech_act "state_busy" & !:activity | :question "what are you doing" --> ask_simple_question
:my_proposition "invite" & :action --> close_off
:speech_act "affirm_okay" --> invite_on_user_schedule
:speech_act %"prefer" --> evaluate_preferred_event
:speech_act "affirm_yes" & :my_proposition "invite" | :search_key --> finalize_joint_event

FIG. 13

METHOD AND SYSTEM FOR GENERATING DIALOGUE MANAGERS WITH DIVERSIFIED DIALOGUE ACTS

BACKGROUND OF THE INVENTION

1. Field of the Invention

The present invention relates to a method and a system for generating dialogue managers with diversified dialogue acts.

2. Description of Related Art

As the spoken dialogue system has been widely used, a dialogue manager (DM) in a dialogue system is getting increasingly complicated. In the design of a dialogue system, the DM plays a role of associating technique with design. Therefore, besides determining appropriate system responses according to the analyzed user speech data, the impression of the user in response to the system is also considered. As such, most of the current dialogue systems are designed manually. Though the manual design ensures the accuracy of the dialogue system, the design cost is rather high, especially when a complicated dialogue system is under design. Moreover, when the total number of the DM rules is increased, it is hard to maintain the consistency of the whole system.

A typical example is given below. According to the designing experience, the system designer puts forward a DM with 19 states. However, after analyzing a great number of dialogue logs, the designer finds that four user defined states are not used at all. Meanwhile, the system act also appears to be uneven and favours a particular act. If there are relatively few states or DM rules, the system designer may easily check the rules to avoid the problem. However, if the number of rules exceeds a certain extent, it is quite difficult to rapidly find out the appropriate rule to make improvements. Moreover, if one rule is modified, other rules may be affected, which may cause unexpected impacts on the system act.

In the development of dialogue system, it has become a common idea to facilitate the design of the dialogue system through user simulation in the applications of the dialogue system. By using the user simulation, the system designer gets to know responses of the dialogue system on certain dialogues, and such information can be used to further improve the dialogue system.

Through the user simulation, simulation data is generated before the system is delivered to customer, which enables the system designer to adjust the dialogue system act; however, this process also needs a lot of labours. Afterwards, the designed acts substantially meet the requirements of the user, i.e., to achieve the final purpose of a dialogue (for example, ticket booking or information query). However, the designed DM system has a fixed act mode.

A fixed dialogue act mode has met the basic requirements in the design of a conventional dialogue system. However, with the expansion of the applications of the dialogue system, many applications require more diversified and varied dialogue systems. Taking the application of a dialogue system in the language learning as an example, if the system act is always fixed each time when the user interacts with the system, the motivation for a user/learner to use the system is lowered. On the contrary, if the system act is diversified, even though the content of the textbook is fixed, the diversified system act may also enhance the learning motivation of the learner. Therefore, as for dialogue systems of next generation, it has become an important issue in the design of a dialogue system about how to effectively accelerate the dialogue system for generating diversified dialogue acts.

In U.S. Pat. No. 5,694,558, entitled "Method and System for Interactive Object-oriented Dialogue Management", an interactive object-oriented DM system is provided, in which a state-based DM is used to divide the whole content of a dialogue into several sub-dialogues (i.e., several different states) according to the topics or types, and each sub-dialogue has the respective dialogue content and dialogue flow. The DM is operated to determine whether to transit to other states or not according to the circumstance of the current dialogue. Each state (i.e., each sub-dialogue) can be represented by an object.

In U.S. Pat. No. 7,167,832, entitled "Method for Dialog Management", a DM system is provided, in which the flow architecture of the DM focuses on the design of motivator. The DM disclosed by the patent includes a plurality of motivators, and the dialogue content in a dialogue system is processed according to the motivators. The DM of the patent at least includes two motivators: assumption and confirmation.

The above patents both emphasize the content architecture of the DM, without mentioning the method required for designing a DM. Furthermore, U.S. Pat. No. 7,024,348, entitled "Dialogue Flow Interpreter Development Tool", provides a dialogue flow development tool used in a dialogue system, so as to generate a data file through a particular control language. The data file contains prompts, responses, branches, and dialogue flows required in a speech system. Through special processing, the data file can automatically generate speech applications, so as to save the cost for developing the whole speech dialogue system. However, in this patent, it is clearly stated that the speech interaction between the user and the system must be designed through the flow aid design in the system design.

In relevant publications and papers, the conventional methods for designing a DM generally include designing through dialog grammar, plan-based DM, and collaborative DM. Different methods have different characteristics, and are applicable for different fields. Moreover, in recent years, it is quite popular to combine the methods with each other in practice.

In two papers, "Plain-Speaking: a Theory and Grammar of Spontaneous Discourse", issued by Reichman in 1981, PhD thesis, Department of Computer Science, Harvard University, Cambridge, Mass. and "A Syntactic Approach to Discourse Semantics" issued by Polany and Scha in 1984, published in Proceedings of the 10th International Conference on Computational Linguistics, Stanford University, California, ACL, 1984, a DM based on dialog grammar is provided. However, this method requires compiling plenty of rules to describe how a dialogue is made. As a result, though the above method appears in early days and has been most widely used, its portability is not high due to the compiling of rules.

Furthermore, in "Automatic Acquisition of Probabilistic Dialogue Models" issued by Kita et al., published in Proceedings of ICSLP'96, pp. 196-199, Philadelphia, 1996 and "Using Markov Decision Process for Learning Dialogue Strategies" issued by Levin E. et al., published in Proceedings of ICASSP'98, pp. 201-203, Seattle, 1998, the dialogue rules are further expressed into finite state network (FSN). The content of a dialogue is divided into different states, and the DM is performed through transiting among different states. In addition, it may also possibly integrate one state with another to alter the weight of a dialogue path.

The plan-based DM not only considers the content of each sentence in words, but also considers actions involved in communication (for example, confirmation and query), and furthermore, people plan certain actions to be used for achieving the purpose of communications. For example, "Analyzing Intentions in Dialogues", issued by J. F. Allen and C. R. Perault et al., published in Artificial Intelligence, 15(3):143-178, 1980 and "Intentions in Communication", issued by P.

R. Cohen, J. Morgan, and M. E. Pollack et al., published in MIT Press, Cambridge, Mass. both mention relevant techniques.

In addition, the collaborative DM considers the dialogue process as a collaborative process. This method mainly captures the intentions of both parties in a dialogue, confirms the intention of each party through several rounds, then continues the dialogue after establishing a common basis, and finally accomplishes the purpose of the dialogue. Relevant techniques are mentioned in, for example, "Conversational Agency: The TRAINS-93 Dialogue management", issued by D. R. Traum in Luperfoy et al. 1996, "Beliefs, Stereotypes and Dynamic Agent Modeling", issued by Y Wilks and A. Ballim et al., or the publication "User Modeling and User-Adapted Interaction", Vol. 1, No. 1, Kluwer Academic Publishers, Dordrecht, The Netherlands, 1991.

Moreover, in an article "Spoken Dialog Technology: Enabling the Conversational User Interface", issued by M. F. McTear, published in ACM Computing Surveys, vol. 34, pp. 90-169, March 2002, the DM is further classified into three types:
(i) System-initiative: the DM is defined by finite states and is achieved through states transitions, and this type of DM is suitable for a relatively narrow application field with relatively fixed dialogue content.
(ii) User-initiative: the user intentions are captured by a frame-based mode, and this type of DM has flexible dialogue content, and the user may express his intentions freely, but the dialogue process thereof is difficult to be handled.
(iii) Mixed-initiative: it is formed by mixing the system-initiative with the user-initiative together, so that the system can fulfil a natural dialogue within certain restrictions.

The above methods cannot be strictly ranked as good or bad, but merely differ from each other in specific properties as well as applicable circumstances.

In addition to the methods commonly used in the past decades, some scholars recently have proposed to make the dialogue system learn relevant responses through the interactions with the user. In such a method, generally, the user designs the state of the dialogue field and relevant objective functions, and employs the reinforcement learning. For example, in articles such as "Using Markov Decision Processes for Learning Dialogue Strategies", issued by E. Levin, R. Pieraccini, and W. Eckert et al., published in Proceedings of the IEEE Transactions on Speech and Audio Processing, 1998, vol. 8, pp. 11-23, or "Optimizing Dialogue Management with Reinforcement Learning: Experiments with the NJ-fun System", issued by S. Singh, D. Litman, M. Kearns, and M. Walker et al., published in Journal of Artificial Intelligence Research, vol. 16, pp. 105-133, 2002, the dialogue system is made to learn the weight of transitions from state to state through objective functions. Through such method, the weight can be obtained by automatic training, but the designer must define transitions among states before hand. However, through designing by this method, the obtained DM is a fixed DM, and cannot be trained to generate diversified variations with the same dialogue purpose.

SUMMARY OF THE INVENTION

In order to make the aforementioned and other objectives, features, and advantages of the present invention comprehensible, embodiments accompanied with figures are described in detail below.

A system for generating a dialogue manager (DM) with diversified dialogue acts is provided. The system comprises a training module and an user simulation module. The training module receives an original DM and generating a plurality of new DMs. The user simulation module simulates user acts in response to the dialogue acts from the DM module, and generates a plurality of dialogue logs according to the dialogues between the dialogue acts and the simulated user acts. The training module adjusts the new DMs according to the dialogue logs in order to generate at least one diversified dialogue manager.

In one embodiment, the training module further comprises a rule generation module and an evaluation module. The rule generation module randomly modifies a plurality of rules within the original DM to generate the plurality of DMs. The evaluation module derives a evaluate score of each of the newly generated DMs by analyzing the dialogue log and the original DM. The rule generation module adaptively generates the new DMs based on the evaluate score of each of the newly generated DMs.

A method for generating a dialogue manager (DM) with diversified dialogue acts is provided. In the method, a plurality of new DMs are generated based on a original DM. A DM is preset for simulating user act, and each of the new DMs through a user simulation module to generate at least one corresponding dialogue log respectively. An evaluate score of each of the newly generated DMs is obtained by analyzing the dialogue log. At least one new derived DM is generated accordingly.

BRIEF DESCRIPTION OF THE DRAWINGS

FIGS. 5A and 5B respectively illustrates the dialogue log and state diagram in the original DM and new DM.

FIG. 8A illustrates content of a dialogue example.

FIG. 9 illustrates a set of original DM rules.

FIG. 10 illustrates a part of the DM rules is marked as activity, and response dialogues are corresponding to such activities based on the DM rules.

FIG. 11 illustrates a part of the DM rules is marked as speech acts.

FIG. 12 illustrates a part of the DM rules is marked as other variables.

FIG. 13 illustrates the newly generated DM.

DESCRIPTION OF THE EMBODIMENTS

Figure 1:
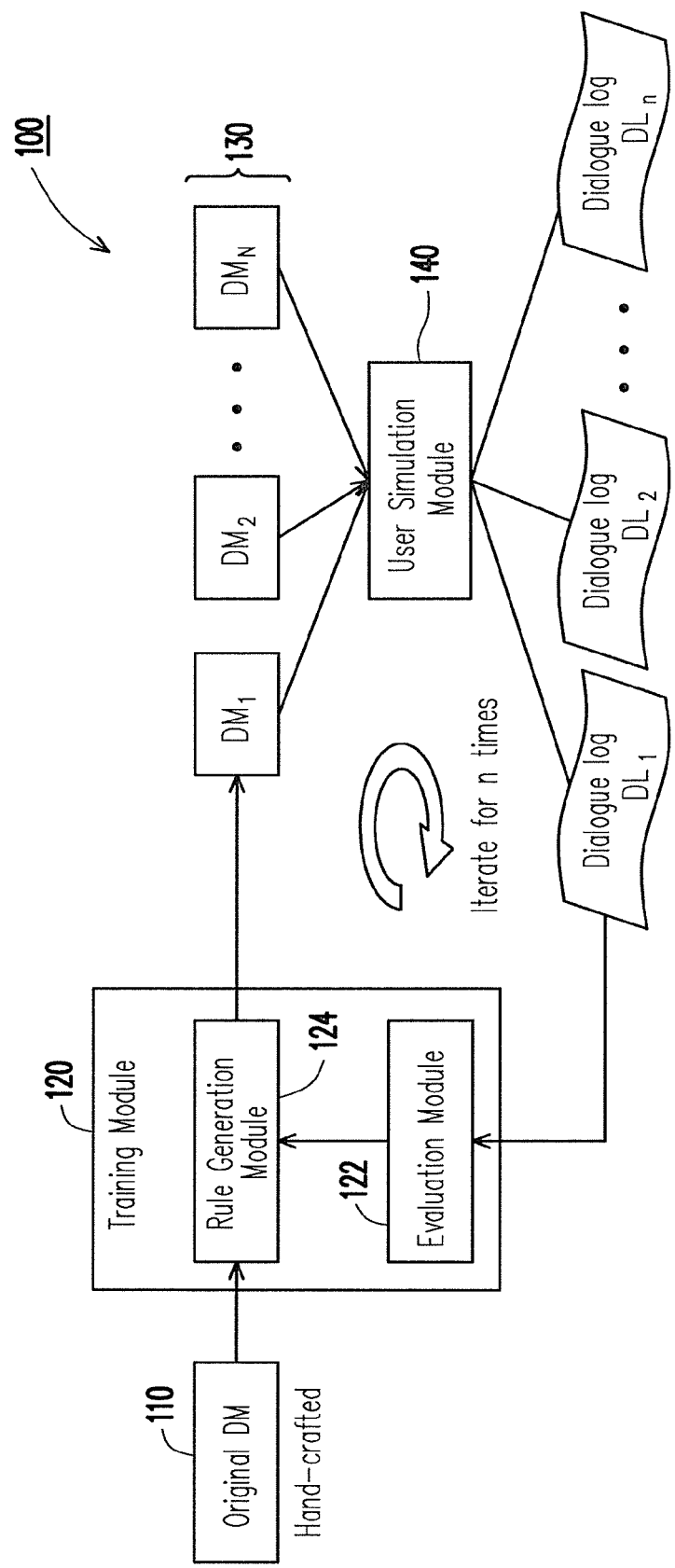
FIG. 1 illustrates a schematic block diagram for illustrating functions of a DM architecture with diversified dialogue acts according to an embodiment of the present invention.

Reference will now be made in detail to the present embodiments of the invention, examples of which are illustrated in the accompanying drawings. Wherever possible, the same reference numbers are used in the drawings and the description to refer to the same or similar parts.

The embodiment of present invention is directed to a method for automatically generating a plurality of dialogue manager (DM) with the same purpose but different dialogue acts according to a DM designed by a designer. Compared with the prior art that the rules used in the DM must be designed manually, the present invention provides an automatic aiding tool, so as to facilitate the design of a dialogue flow and the adjustment of DM rules, and also assist a system designer to find out possible problems in the original DM.

The above method is applicable to a DM of any architecture, including dialog grammar, plan-based DM, and collaborative DM. While the DM optimization in reinforcement learning is only applicable to finite-state DM or dialog-grammar DM, and can only obtain a unique optimal DM, the above method of the embodiment of present invention focuses on generating diversified DMs, with different dialogue acts but the same dialogue purpose.

In the above DM for a dialogue system, the current DM is utilized, together with a user simulation technique and a specially designed scoring function, so as to automatically generate a plurality of new DMs after iterating dialogue simulations for a plurality of times.

The new DMs achieve the same dialogue purpose as the original DM, but differ from the original DM in system acts and responses during the dialogue process. Through the above method, the dialogue flow of the dialogue system is enriched, and meanwhile, the design and improvement of the DM are also accelerated.

According to an embodiment, a method for generating a DM with diversified dialogue acts is provided, which adopts a training mechanism, a user simulation module. The training mechanism includes an evaluation module for evaluating degree of similarity between dialogue purposes of different DMs according to dialogue logs, thereby generating a plurality of DMs. The user simulation mechanism is a DM preset to simulate the user acts.

According to an embodiment, the training mechanism includes an evaluation module, and a rule generation module. The evaluation module generates an evaluation score for a DM according to the dialogue log produced by the interaction between the DM and the user simulation module. The rule generation module performs a variation operation on DMs according to evaluation scores of a plurality of DMs. Then, new DMs are generated. After several rounds of training, as the evaluation scores of the generated DMs are getting higher, the dialogue purpose is more and more similar to that of the original DM. Meanwhile, through the rule generation module, the acts of the generated DM are ensured to be different from those of the original DM.

According to an embodiment, the evaluation module analyzes the dialogue logs generated by the interaction between DMs and the user simulation module, so as to find out a difference between the newly generated DMs and the DM designed by the user, thereby setting evaluation scores for the DMs according to such difference.

According to an embodiment, the rule generation module first randomly varies, a part of the content of the DMs according to the DM designed by the user, so as to generate a plurality of different DMs.

Interactions between each DM and user simulation mechanism may generate corresponding dialogue logs. Dialogue logs are evaluated by an evaluation mechanism. After evaluation, a variation mechanism and a rule generation module perform a variation operation on the DM according to the evaluation score of each dialogue DM, thereby generating a new DM, so as to provide DMs for subsequent training.

The user simulation mechanism is also a DM, for designing or collecting DM acts through hand-craft, so as to simulate all the possible act modes of a user who interacts with the dialogue system.

According to the present invention, a plurality of DMs with the same purpose but different dialogue acts is automatically generated. Particularly, the current DM is utilized, together with a user simulation technique and a specially designed scoring function, so as to automatically generate a plurality of new DMs. The present invention is illustrated in detail below through specific embodiments.

Referring to FIG. 1, a schematic block diagram is provided for illustrating functions of a DM architecture with diversified dialogue acts according to another embodiment of the present invention. The architecture 100 includes a training module 120 and a user simulation module 140. The training module 120 further includes an evaluation module 122 and a rule generation module 124.

A training module 120 receives an externally hand-crafted original DM 110. Firstly, the rule generation module 124 generates a plurality of different DM information 130 randomly, for example, $DM_1, DM_2, \ldots, DM_N$ shown in the figure. The user simulation module 140 is a DM preset to simulate user acts. The user simulation module 140 simulates the user's acts when the user makes a dialogue with the DM module of the system, and generate N corresponding dialogue logs (for example, $DL_1, DL_2, \ldots, DL_N$ shown in the figure) after performing N rounds of dialogue simulations according to the different DM units $DM_1, DM_2, \ldots, DM_N$. That means that the dialogue simulations are iterated for N times for generating the dialogue logs $DL_1, DL_2, \ldots DL_N$, as shown. Then, an evaluation module in the training module 120 evaluates the degree of similarity between dialogue purposes of the different DMs based on dialogue logs $DL_1, DL_2, \ldots, DL_N$. Finally, the rule generation module generates a plurality of DMs based on the scores of existing DMs.

The operation manner of the rule generation module 124 is described as followed.

Some rules in the original DM are modified at random to obtain a new DM. Thus, all-together N DMs, $DM_1, DM_2, \ldots, DM_N$, are generated accordingly, and the evaluation scores thereof are respectively $S_1, S_2, \ldots, S_N$. Next, a DM "reproduction "flow is performed. That is, m DMs are preserved, and the other (N-m) DMs are generated through modifying the original DM at random.

Therefore, the probability $P_i$ for the $DM_i$ to be preserved in the next cycle is:

$$P_i = \frac{S_i}{\sum_{n=1}^{N} S_n}.$$

The probability for preservation is determined according to the magnitude of the evaluation score. In addition to the above method, a rule variation flow can also be provided in the embodiment, which will be described in the following description. The training module 120 can be implemented to incorporate with a rule generation module to produce variations. That is, when the preset value of the probability $P_i$ obtained, the value of a certain rule in the DM mutates at random.

One of the variation operation is mutation. Mutation operation will change some part of the rule, to "mutate" as a new rule. For example, if there is a DM rule, A is subject, C is activity, r is "Tom", s is "play Tennis", then $Action_1$ means a dialogue act:

If (A=r) and (C=s) then $Action_1$.

After mutation, The "$Action_1$" may be changed as "$Action_n$", making the rule become:

If (A=r) and (C=s) then $Action_n$.

$Action_n$ is another dialogue act different from $Action_1$.

Figure 4:
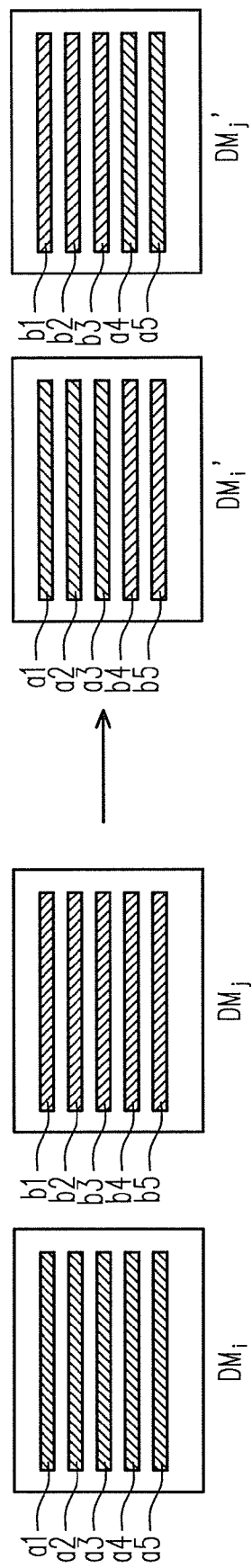
FIG. 4 illustrates a crossover operation is performed on the original DM information, and $DM_i$ and $DM_j$ are respectively performed the crossover operation.

Another rule variation manner adopts a "crossover" mode, which will be introduced accompanying with FIG. 4. The evaluation manner of the evaluation module 122 is also introduced below accompanying with FIGS. 5A and 5B, and the evaluation score of the evaluation module 122 is introduced accompanying with FIGS. 6A and 6B.

The design of the evaluation module 122 is shown as follows.

1. A set of the dialogue system's possible states is defined, so that each sentence in the dialogue log corresponds to a state in the list of system states through the processing of the user simulation module 140.

2. All the dialogues in the current dialogue log are mapped to the corresponding states, and the states are interconnected with each other according to the context of the dialogues. This state diagram represents the dialogue interaction between current DM and user simulation mechanism.

3. New dialogue logs are generated based on the interaction between new DM and user simulation mechanism. Those dialogue logs are also processed by the LU modules, and then mapped to the same state set. Then, the states are interconnected according to the context of the dialogues. This state diagrams represents the dialogue interaction between new DM and user simulation mechanism.

4. The state diagram of the current DM with user simulation mechanism is compared with that of the new DM, so as to determine whether the new DM is desired or not according to the degree of similarity.

5. The connections between the states generated in the new DM cannot exceed that of the current DM. However, the path from the initial state to the end state can be different from that of the original DM.

Therefore, in Step 4, the degree of similarity is defined as: (1) a proportion for the state connection of the new DM that exceeds the state connection of the original DM, in which the lower the proportion is, the more similar the new DM and the original DM tend to be in terms of the possible transitions between states, and thus, the higher the score is; and (2) in the state connection of the new DM, whether the initial state is connected to other states, and whether any of the states is connected to the end state.

6. In Step 5, the definitions (1) and (2) of the degree of similarity are two different evaluation types, and a score is obtained through the weights of the two types. The score is used to indicate the new DM under test.

Figure 2B:
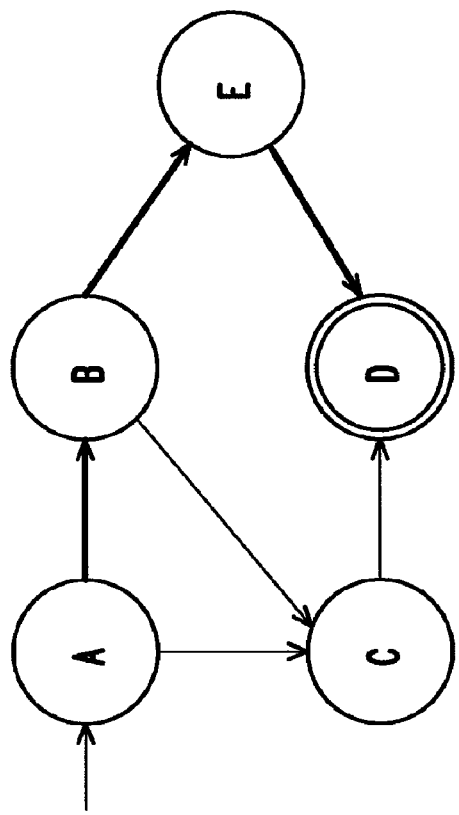
FIG. 2B illustrates a state diagram generated by the new DM.
Figure 2A:
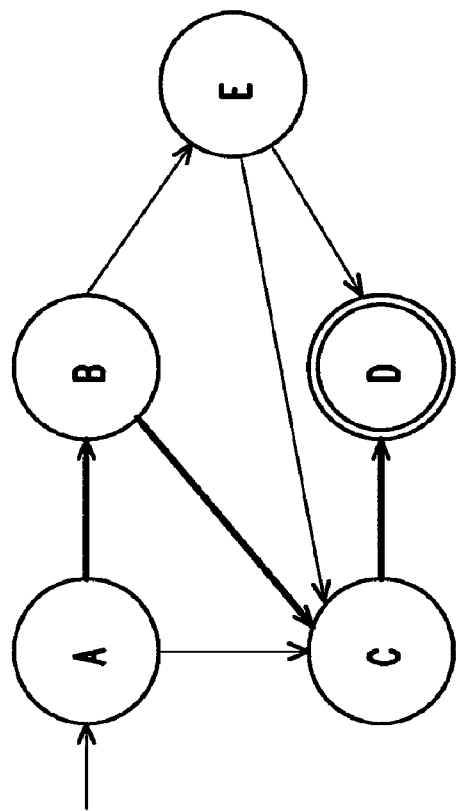
FIG. 2A illustrates a state diagram generated by the original DM.

Referring to FIGS. 2A and 2B, it is assumed that FIG. 2A is a state diagram generated by the original DM, and FIG. 2B is a state diagram generated by the new DM. It can be found that the two state diagrams have different dialogue acts, but the two diagrams both start from the initial state to the end state. Meanwhile, the state transition in FIG. 2B does not exceed that of FIG. 2A, the new DM is similar to the original DM, so the evaluation score in FIG. 2B is extremely high.

In the above training flow, after the evaluation mechanism is set, the training and generation of the dialogue mechanism can be carried out in the following steps shown in FIG. 1.

1. The rule generation module 124 generates a plurality of DM ($DM_1, DM_2, \ldots, DM_N$).

2. The interaction between DM module 130 and the user simulation module 140 generates a plurality of dialogue logs respectively corresponding to each $DM_1, DM_2, \ldots, DM_N$, such as dialogue logs $DL_1, DL_2, \ldots DL_n$ in the figure.

3. Each dialogue log serves as input in the evaluation module 122 of the training module 120, and then a score is obtained.

4. The rule generation module 124 appropriately adjusts and selects each DM according to the evaluation score thereof.

5. Finally, the rule generation module 124 generates a plurality of new DMs and the evaluation scores of the DMs. The set of the new DMs may include original DMs, the rules adjusted and modified by the rule generation module 124, or completely new DMs generated at random. The proportion for generating the new kinds of files is fixed, and meanwhile, the probability for keeping the existing DMs is in direct proportion to the evaluation score.

6. Finally, after several rounds of interactions, the generated DMs achieve a higher average score. That is, the dialogue purpose of the generated DMs is much more similar to that of the original DM. Moreover, the generated DMs have the same dialogue purpose as the original DM but differing in dialogue acts. Please refer to FIG. 3, which illustrates a schematic flow chart for illustrating an embodiment of a method for generating a dialogue manager (DM) with diversified dialogue acts.

Figure 3:
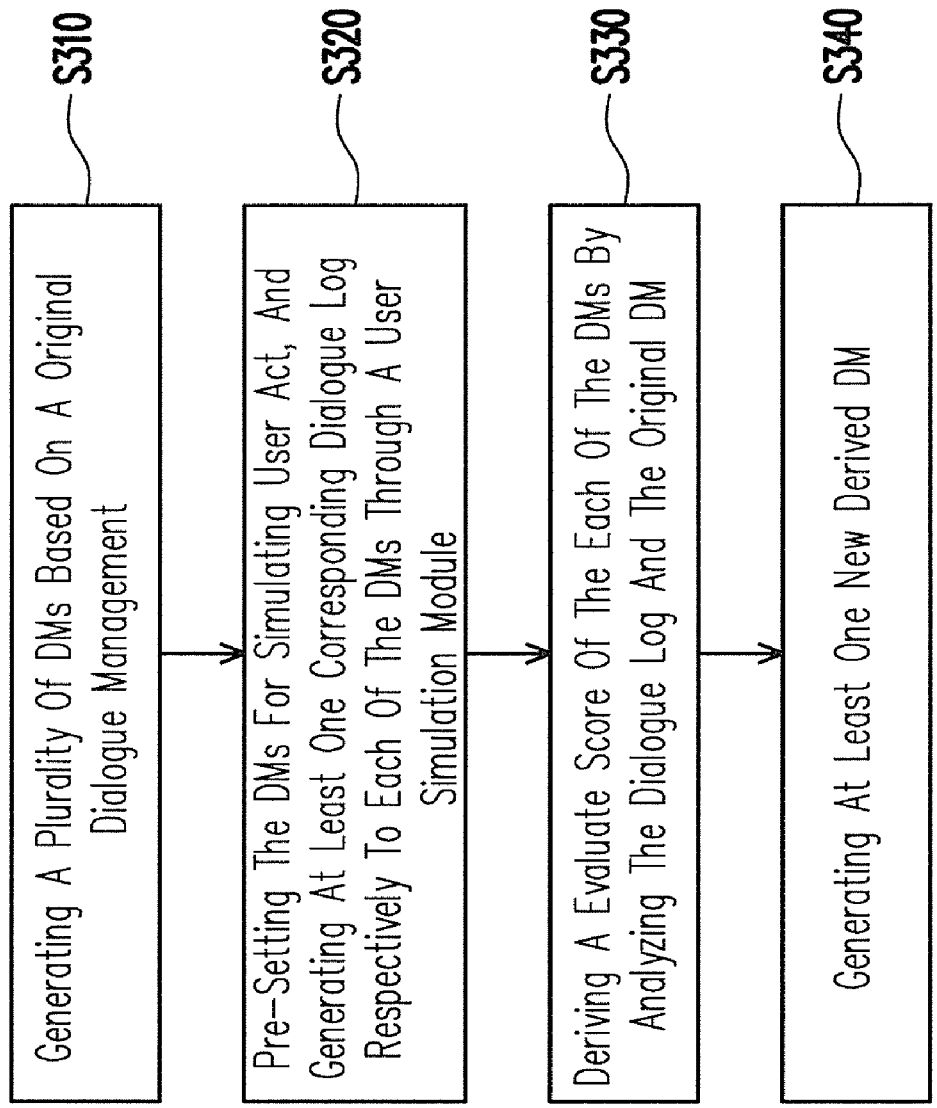
FIG. 3 illustrates a schematic flow chart for illustrating a method for generating a dialogue manager (DM) with diversified dialogue acts according to an embodiment of the present invention.

FIG. 3 illustrates a schematic flow chart for illustrating a method for generating a dialogue manager (DM) with diversified dialogue acts according to an embodiment of the present invention. Referring to FIG. 3, in the method, as in step S310, a plurality of new DMs is generated based on a original dialogue manager. Then, in step S320, the DMs are pre-set for simulating user's acts, and thereby at least one corresponding dialogue log respectively to each of the new DMs through a user simulation module is generated. In following step S330, a corresponding evaluate score of each of the new DMs is derived by analyzing the dialogue log and the original DM. The method for deriving the evaluate score of the newly generated DM includes a plurality of rules within the original DM and the newly generated DM are mapped to a corresponding dialogue history respectively. A state diagram is obtained based on a corresponding dialogue status of the newly generated DM. Then the state diagram of the newly generated DM is compared with the state diagram of the original DM to derive the evaluate score. Then, as in step S340, at least one new derived DM is generated. The dialogue purpose of the new derived DMs is sufficiently close to the original DM in a dialogue system.

An embodiment of a variation manner which can be applied to the rule generation module to train the new derived DMs with diversified dialogue acts of the present invention is illustrated in FIG. 4. The rule variation manner adopts a "crossover mode". A part of the rule sets in the two DMs are interchanged with each other for a preset probability q. Referring to FIG. 4, the DM rules, i.e., $DM_i$ and $DM_j$, are respectively formed by five rules "a1, a2, ... a5" and "b1, b2, ... b5". After testing and dialogue simulation, the $DM_i$'s rules are changed into $DM_i'$, which is "a1, a2, a3, b4, b5", and the $DM_j$'s rules are changed into $DM_j'$, which is "b1, b2, b3, a4, a5".

An embodiment of an evaluation manner of the evaluation module of the present invention is illustrated in FIGS. 5A and 5B.

First, a state set for the dialogue system is defined. Accordingly, each sentence in the dialogue log is corresponding to only one state. For example, the dialogue content "Do you like playing baseball?" is assigned with a state "state_verify_activity", and the dialogue content "Are you free tomorrow?" is assigned with a state "state_verify_schedule". The dialogue logs in the original DM are corresponding to a state diagram for representing dialogue acts of the original DM. An original DM rule set 510 in FIG. 5A is converted into a dialogue log 520 through user simulation, and then converted into a state diagram 530. Next, referring to FIG. 5B, any of the new generated DM is corresponding to a state diagram 540 through a user simulated, i.e., the dialogue acts of the new DM. Afterwards, the state diagrams 530, 540 are compared with each other to determine an evaluation score of the new generated DM.

Figure 6B:
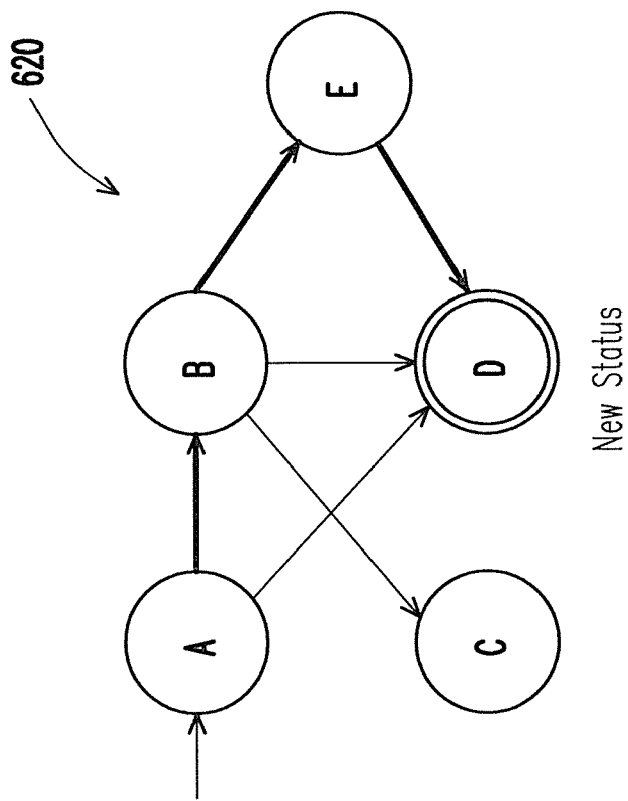
FIGS. 6A and 6B illustrates an embodiment for evaluating score in the evaluation module by the state diagrams.
Figure 6A:
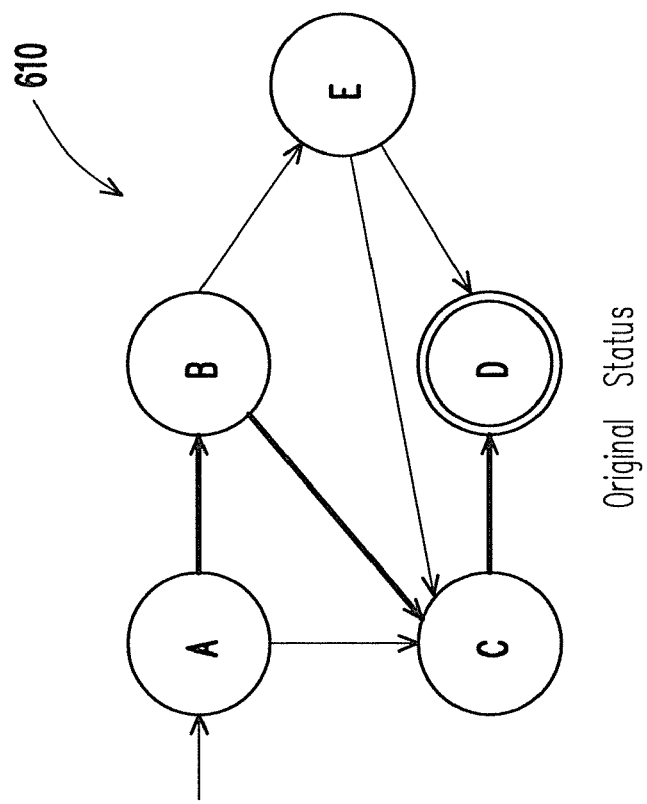

An embodiment for illustrating the evaluation score of the evaluation module of the present invention is shown in FIGS. 6A and 6B. The variables are defined as follows.

In an original state diagram 610 Dorg of FIG. 6A, Eorg is an edge set of Dorg. The edge means that there is a transition from one state to another. For example, if the dialogue is as follows:

A: Do you like playing baseball?
B: Yes, I do.

Then there is an edge from the state "state_verify_activity" representing the first sentence, to the state "state_affirm_yes" that representing the second sentence, and in a new state diagram 620 Dnew of FIG. 6B, Enew is an edge set of Dnew.

Therefore, through a score evaluation function, the degree of similarity $C_1$ for state transition is a proportion for the new state connection in the original state connection:

$$C_1 = \frac{|E_{new} \cap E_{org}|}{|E_{new}|}.$$

Furthermore, a proportion $C_2$ for successfully completing a dialogue is the proportion of the edge set in a complete dialogue:

$$C_2 = \frac{|\text{the number of Edge for completing a dialogue}|}{|\text{total number of Edge in the dialogue log}|}.$$

$S_{new} = p \times C1 + (1-p) \times C2$, where $0 \leq p \leq 1$.

For example, it is illustrated below with reference to FIGS. 6A and 6B.

First, dialogue logs in a new state diagram 620 are: ABD, ABD, ABC, AD, ABED, ABE, ABC, ABC, and ABC.

Vertexes $E_{new}$ of the new state diagram 620 are: AB, BE, ED, AD, BD, and BC. Wherein $|E_{new} \cap E_{org}|$ are AB, BE, ED, and BC.

$$C_1 = \frac{|E_{new} \cap E_{org}|}{|E_{new}|} = \frac{4}{6} = 0.67.$$

Dialogue logs: ABD, ABD, ABC, AD, ABED, ABE, ABC, ABC and ABC.

$$C_2 = \frac{|\text{the number of Edges for completing a dialogue}|}{|\text{total number of Edges in the dialogue log}|} = \frac{8}{18} = 0.44.$$

If p=0.5: $S_{new}$=0.5×0.67+(1−0.5)×0.44=0.56.

Figure 7A:
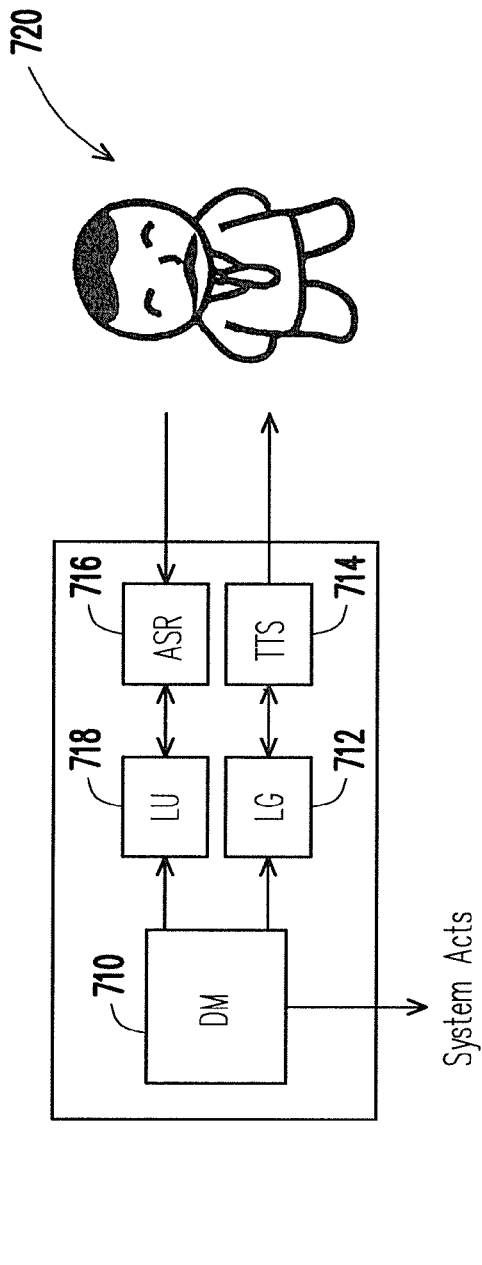
FIGS. 7A and 7B illustrates an architecture of user simulation module of an embodiment of the invention.
Figure 7B:
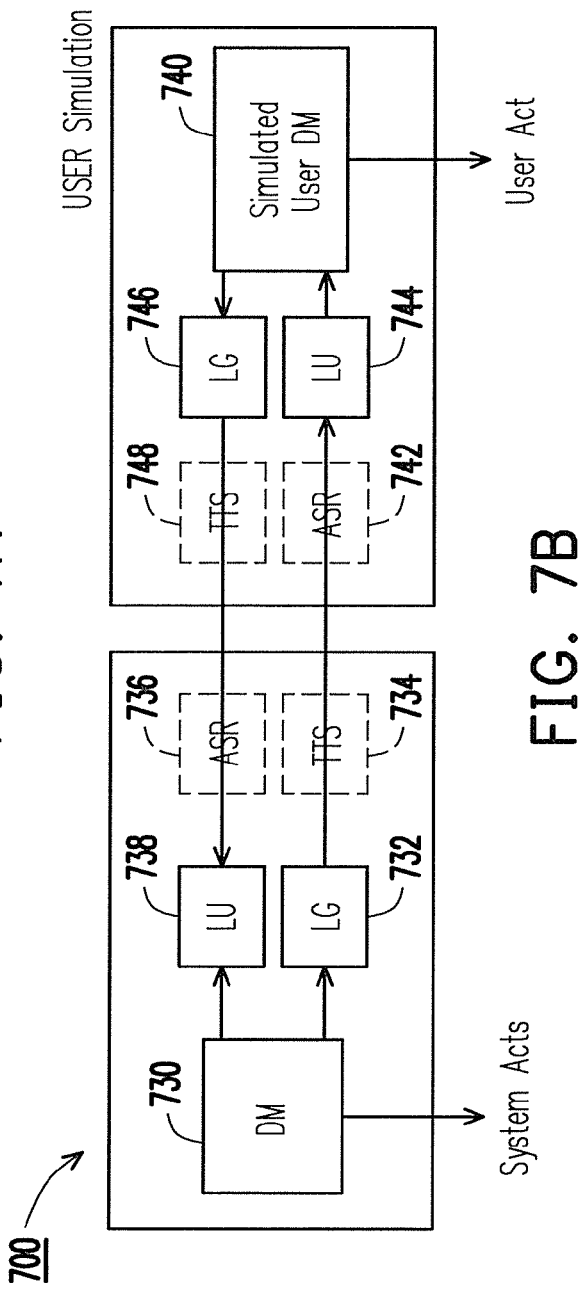

An architecture of the user simulation module is shown in FIGS. 7A and 7B. Referring to FIG. 7A, a corresponding speech of the dialogue content in a conventional DM 710 is transmitted to a user 720 through an LG unit 712 and a text to speech (TTS) unit 714. Then, the user 720 makes a response according to the speech content. Then, the speech content is obtained by an automated speech recognition (ASR) unit 716 and then transmitted back to the DM 710 through an LU unit 718.

An exemplary architecture of the present invention is shown in FIG. 7B, in which the dialogue training is automatically performed through the system act and user acts obtained through user simulation. In the dialogue system 700, a corresponding speech of the dialogue content in a DM 730 is transmitted to a user simulation module through an LG unit 732. Afterwards, the speech content is obtained and transmitted back to the user simulation DM 740 through an LU unit 744. Then, a corresponding dialogue content generated by the user simulation DM 740 is transmitted to the system through an LG unit 746. Thereafter, the speech content is obtained and transmitted back to the DM 730 through an LU unit 738. In the conventional architecture, the TTS and ASR modules are required for operation because the system is operated with the user. However, in the user-simulated architecture of the invention, there is no problem for speech generation and voice recognition. In the embodiment, the LG unit 732 from the system side is directed connected to the LU unit 744 in the user simulation side, and the LG unit 746 is also directed connected to the LU unit 738 without the ARS unit and the TTS unit.

Practical embodiments are given below. Referring to FIG. 8A, the content of a dialogue is listed as follows:
User 1: Do you like playing baseball?
User 2: No, I don't!
User 1: What are you going to do on Friday?
User 2: No plan yet.
User 1: Would you like to dance?
User 2: Dance is fine, but I prefer playing tennis or football, watching TV, and going to the cinema.
User 1: How about playing football on Monday afternoon?
User 2: Great!
User 1: Ok! Let's play football on Monday afternoon.
User 2: See you then.

Figure 8B:
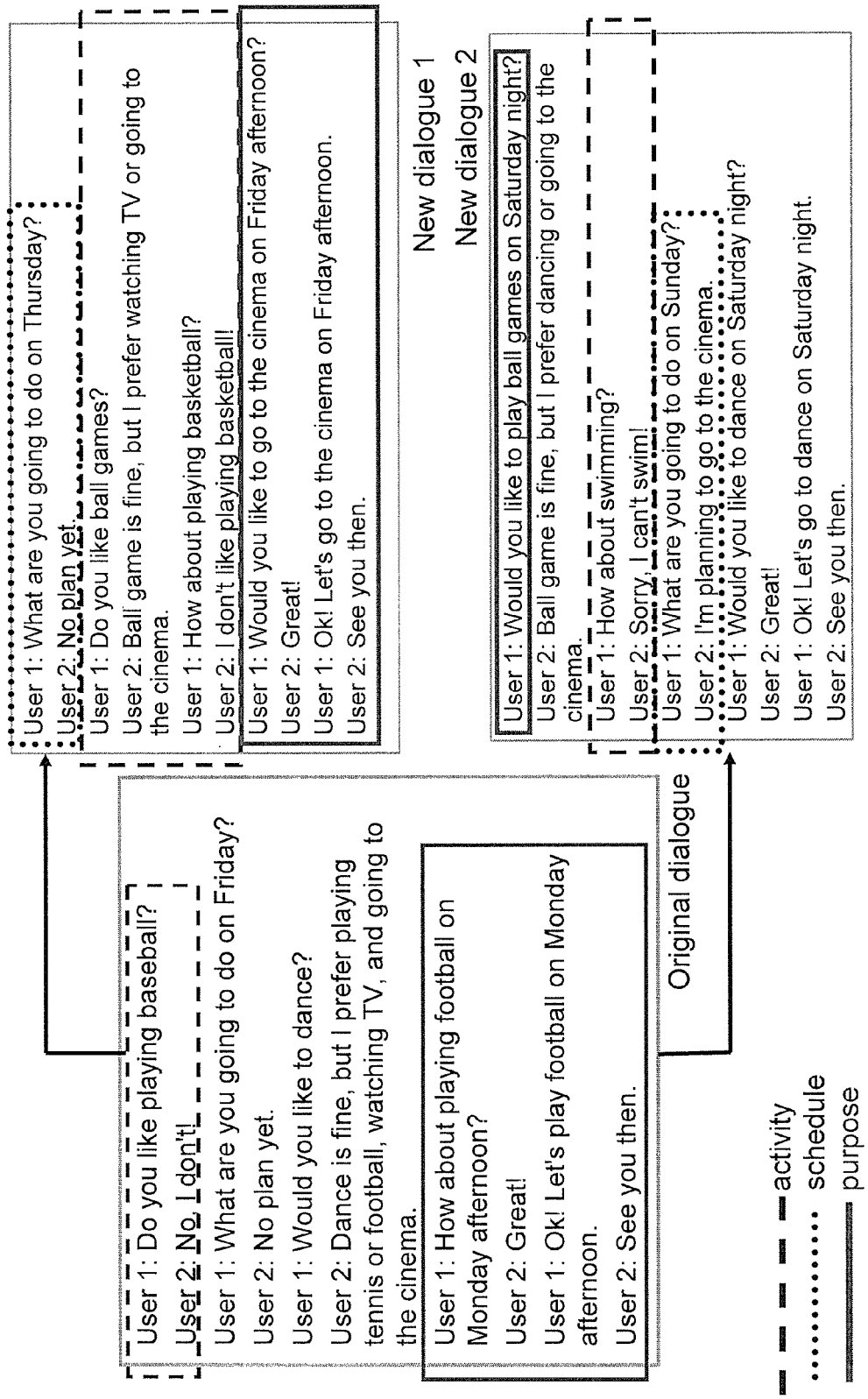
FIG. 8B illustrates two sets of new dialogue content generated according to an original dialogue example of FIG. 8A according to catalogs by activity, schedule and purpose.

Next, referring to FIG. 8B, two new dialogue contents are generated and listed below.
New dialogue 1
User 1: What are you going to do on Thursday?
User 2: No plan yet.
User 1: Do you like ball games?
User 2: Ball game is fine, but I prefer watching TV or going to the cinema.
User 1: How about playing basketball?
User 2: I don't like playing basketball!
User 1: Would you like to go to the cinema on Friday afternoon?
User 2: Great!
User 1: Ok! Let's go to the cinema on Friday afternoon.
User 2: See you then.
New dialogue 2
User 1: Would you like to play ball games on Saturday night?
User 2: Ball game is fine, but I prefer dancing or going to the cinema.
User 1: How about swimming?
User 2: Sorry, I can't swim!
User 1: What are you going to do on Sunday?
User 2: I'm planning to go to the cinema.

User 1: Would you like to dance on Saturday night?
User 2: Great!
User 1: Ok! Let's go to dance on Saturday night.
User 2: See you then.

In all the dialogues, the content in a dialogue can be divided into three part: asking about activity, asking about schedule, and purpose an activity at appropriate time, which are respectively marked by a dashed line, a dotted line, and a solid line. For example, in the original dialogue, "User 1: Do you like playing baseball? User 2: No, I don't!" is a dialogue about asking activity, and the last two dialogues "User 1: How about we playing football on Monday afternoon? User 2: Great! User 1: Ok! Let's play football on Monday afternoon. User 2: See you then." are dialogues about purpose. In the new dialogues 1 and 2, as shown in the figure, the contents about activity, schedule, or purpose are respectively marked.

In the original DM rules, as shown in FIG. 9, the content of the dialogues is illustrated, and meanwhile, the content of response dialogues is obtained accordingly. According to the above descriptions, the dialogue content is divided into asking about activity, asking about schedule, and purpose. Therefore, in FIG. 10, based on the DM rules, a part of the response content is marked as activity, and response dialogues are corresponding to such activities, such as "rephrase_question", "close_off", "initial_question", "apologize_not_understood", and "repeat_response". Furthermore, as shown in FIG. 11, speech acts are marked, for example, speech_act "confirm", speech_act "close_off", speech_act "state_dislike", speech_act "state_busy", and speech_act "affirm_okay". Different variables are marked in FIG. 12, for example:

"action understand &:truth_value not"
"meta_clause "good_bye" | is_final "1""
"initial_question"
"action repeat"
"!activity |:question "what are you doing""
"my_proposition "accept""
"my_proposition "invite"|:search_key ":activity""

Referring to Table 1, the above speech acts can be classified into 19 categories by content.

TABLE 1

| Clarifier | affirm_yes | affirm_okay |
|---|---|---|
| Confirm | close_off | propose_activity |
| state_busy | state_preference | state_like |
| state_dislike | state_free | verify_free |
| verify_busy | wh_question_like | wh_question_schedule |
| verify_like | affirm_no | state_preference |
|  |  | affirm_okay |
| state_also_like |  |  |

For example, "verify_like" represents "Do you like playing baseball?", and "state_dislike" represents "No, I don't!".

The activity can be classified into 11 types, including, for example, baseball, tennis, reading, and shopping. The schedule can be classified into 3 types, including, for example, Monday, Tuesday, today, and tomorrow.

To reach concept consistency, the contents of the speech acts should be considered for consistency, for example, the activity in the question and the activity in the answer would be considered consistent with each other. For example, the question and the answer are as followed:
Question: Would you like to play tennis tomorrow?
Answer: Great! Let's play baseball tomorrow!
The activity in the question is "tennis" and the activity in the answer is "baseball", which the problem of inconsistency occurs and would be considered for further operation.

The context consistency of the content words should be considered, instead of the actual values thereof:
If $a_{11}=a_{21}$ then $(M_1 a_{11})(M_2 a_{21})=(M_{10})(M_{20})$
If $a_{11} \neq a_{21}$ then $(M_1 a_{11})(M_2 a_{21})=(M_{10})(M_{21})$ or $(M_{11})(M_{20})$.

For example, $a_{11}$ refers to "today", and $a_{21}$ refers to "tomorrow". The consistency is confirmed by comparing these key words.

The values of the aforementioned time and activity fields may be 0, 1 or NULL.

All the states are 19 (type of speech acts)×3 (type of activities)×3 (type of schedules)=171, that is, there are totally 171 types of states, and thus, varied state diagrams can be formed.

Afterwards, the DM architecture with diversified dialogue acts provided by this embodiment is converted into a new DM, as shown in FIG. 13.

Figure 14:
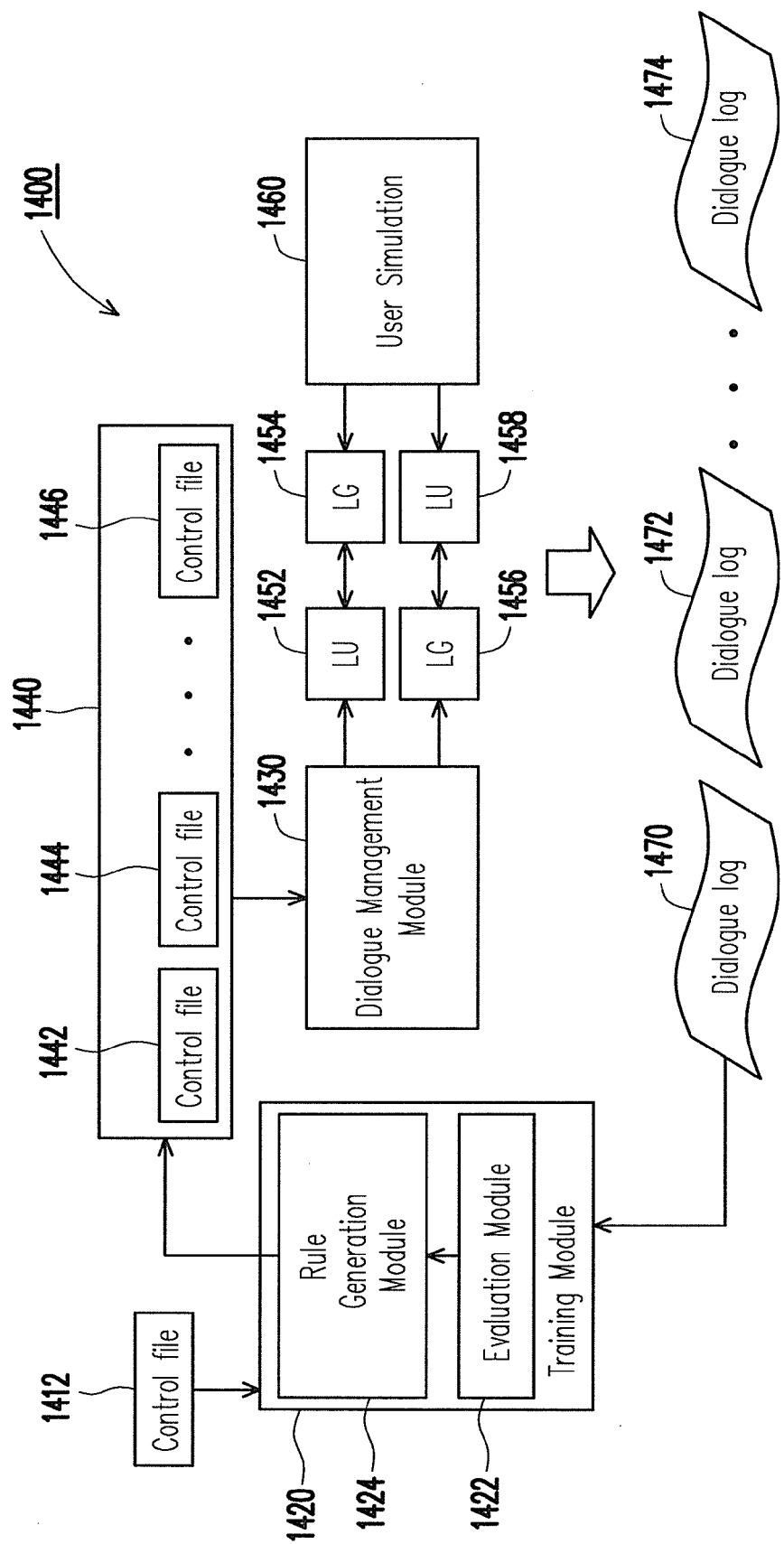
FIG. 14 illustrates a schematic block diagram for illustrating functions of a DM architecture with diversified dialogue acts according to an embodiment of the invention.

FIG. 14 illustrates a schematic block diagram for illustrating functions of DM architecture with diversified dialogue acts according to another embodiment of the invention.

In the embodiment, control files of the DMs are used for illustration as an example. The architecture 1400 includes a training module 1420, a DM module 1430, a storage device 1440 and a user simulation module 1460. The training module 1420 receives a control file 1412 of an external original DM. An evaluation module 1422 in the training module 1420 evaluates the degree of similarity between dialogue purposes of different DMs, thereby generating a plurality of control files for the different DMs. The control files, for example, control files 1442, 1444, or 1446 shown in FIG. 14, are temporarily stored in a storage device 1440. The DM module 1430 determines the acts according to the control files of the DMs. The user simulation module 1460 is a DM preset to simulate user acts. The user simulation module 1460 is also a DM for simulating a user's acts when the user interacts with the DM module 1430 of the system. The DM module 1430 and the user simulation module 1460 interact with each other through language understanding ("LU") modules and language generation ("LG") modules, to generate a series of dialogue logs. As shown in FIG. 14, the dialogue interactions between the DM module 1430 and the user simulation module 1460 are performed by an LU 1452, an LG 1454, an LG 1456, and an LU 1458 by a reciprocal manner. The plurality of dialogue logs generated in such an interaction process, for example, a plurality of dialogue logs such as 1470, 1472, 1474 shown in FIG. 14, is evaluated by the training module 1420. Therefore, according to the above scores obtained in evaluation, the control files of plenty of new DMs are selected, adjusted, and generated.

After several rounds of dialogue interactions between the DM module 1430 and the user simulation module 1460, the plurality of dialogue logs such as 1470, 1472, and 1474 is generated, and then, a plurality of control files is generated by the training module 1420, so that particular demands can be satisfied, i.e., the DM of the present invention has the same dialogue purpose as the original DM, but differs in dialogue acts. Different modules provided in this embodiment are illustrated below.

The training module 1420 may generate DM control files through different training methods. In order to obtain diversified DMs with the same dialogue purpose through training, a critical factor lies in an appropriate evaluation module inside the training module, to evaluate dialogue logs generated by interactions between the DM module 1430 and the user simulation module 1460 in the system, so as to find out if the tested DM control files can accurately fulfill the task of this system.

Figure 15A:
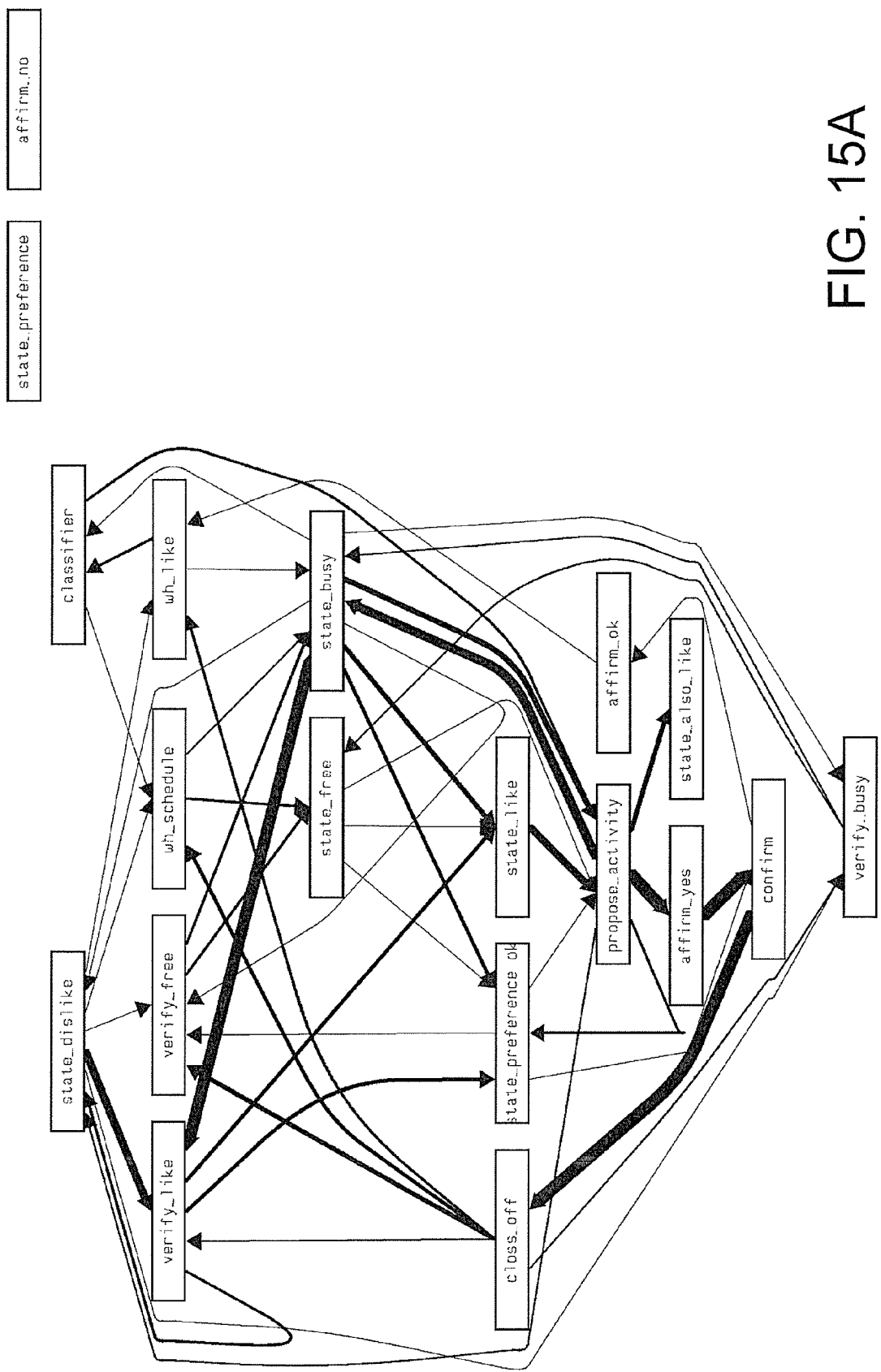
FIG. 15A is a dialogue state diagram generated by the original DM.
Figure 15B:
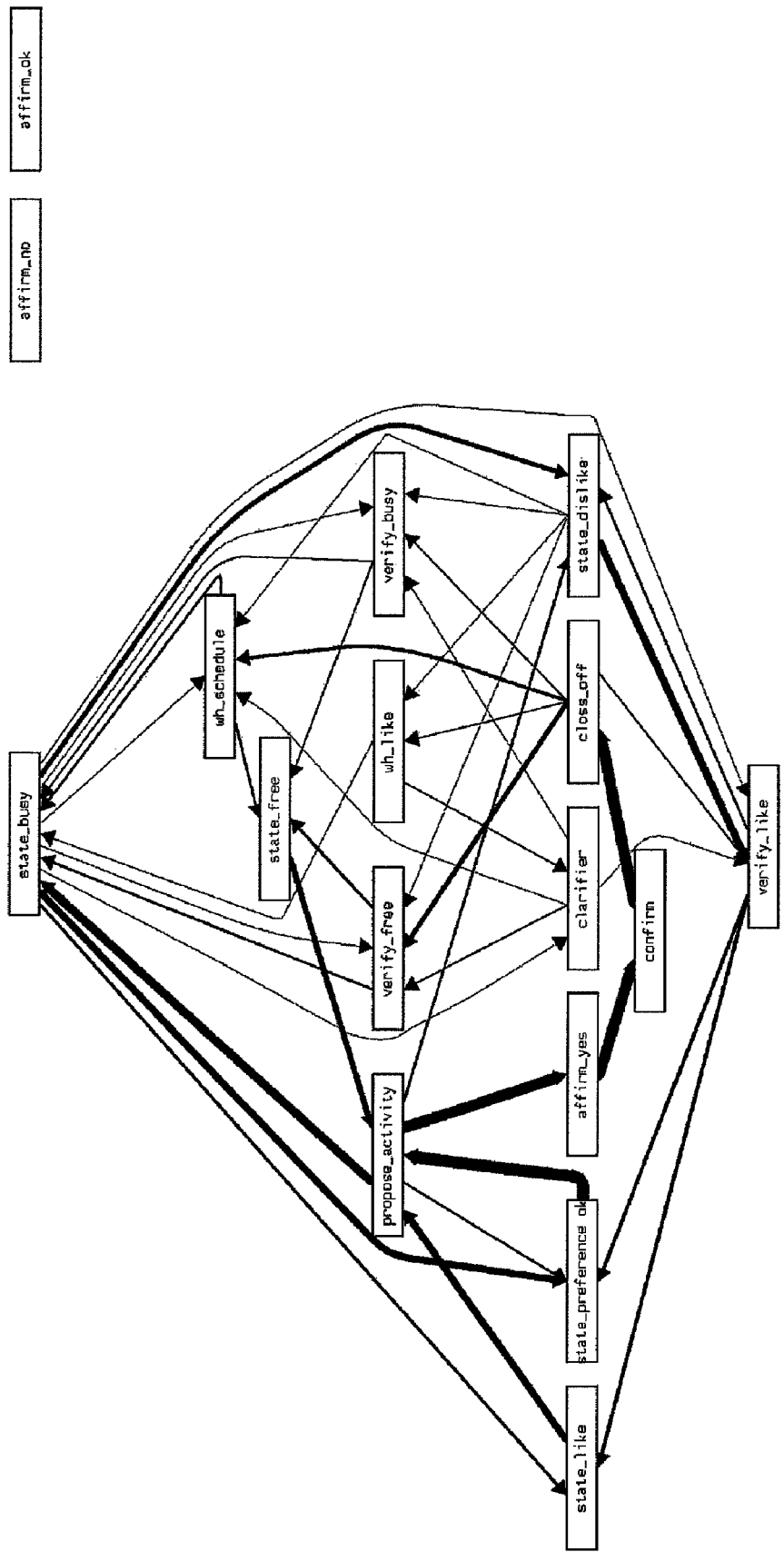
FIG. 15B is a new dialogue state diagram.
Figure 16B:
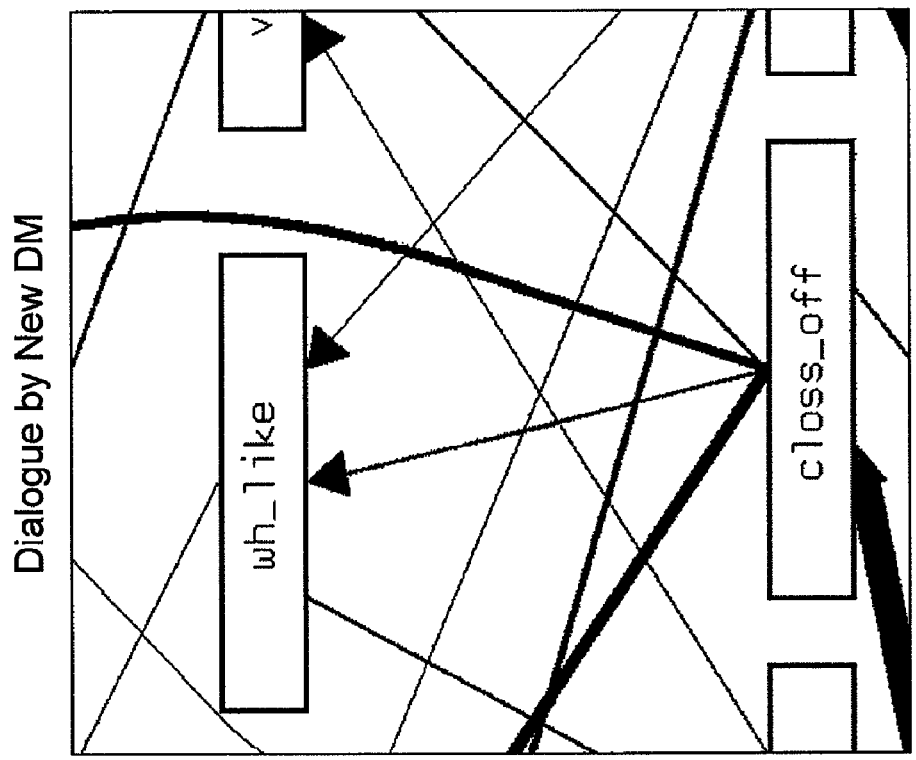
FIGS. 16A and 16B are amplified dialogue state diagrams respectively generated by the original DM and the new DM.
Figure 16A:
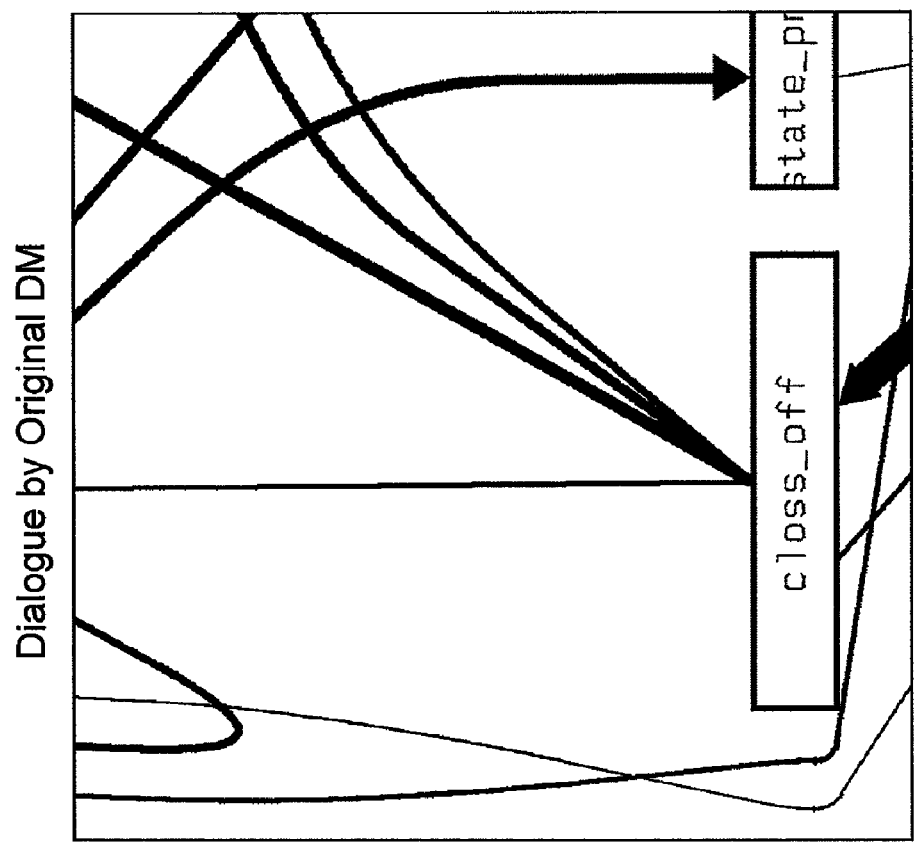

FIG. 15A is a dialogue state diagram generated by the original DM, and FIG. 15B is a new dialogue state diagram. In addition, FIGS. 16A and 16B are amplified dialogue state diagrams respectively generated by the original DM and the new DM.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for generating dialogue managers (DMs) with diversified dialogue acts, the system comprising:
    a training module, for receiving an original DM and randomly generating a plurality of first DMs in the beginning; and
    an user simulation module, for simulating user acts in response to the dialogue acts from each of the first DMs, and generating a plurality of dialogue logs according to the dialogues between the dialogue acts and the simulated user acts, wherein the training module adjusts the first DMs according to the dialogue logs in order to generate a plurality of second DMs.

2. The system of claim 1, wherein the training module comprises an evaluation module, for evaluating a degree of similarity between dialogue purposes of the original DM and each of the first DMs or the second DMs.

3. The system of claim 1, further comprising a language understanding module and a language generation module for dialogue interactions between a DM module and the user simulation module.

4. The system of claim 1, wherein the user simulation module comprises a user DM for simulating user acts when the user makes a dialogue with the dialogue system.

5. The system of claim 1, wherein a plurality of dialogue interactions between the first DMs and the user simulation module are iterated for a plurality of times for generating the plurality of second DMs.

6. The system of claim 1, the training module further comprising:
    a rule generation module, randomly modifies a plurality of rules within the original DM to generate the plurality of first DMs; and
    an evaluation module, derives a evaluate score of each of the plurality of first DMs or the plurality of second DMs by analysing the dialogue logs, wherein the rule generation module adaptively generates a plurality of derived new DMs based on the evaluate score of the plurality of first DMs or the plurality of second DMs.

7. The system of claim 6, wherein the rule generation module uses evolutionary computation to adaptively generate the at least one derived new DMs based on the evaluation score of each of the plurality of first DMs or the plurality of second DMs.

8. The system of claim 6, wherein the evolutionary computation comprises evolutionary operators as reproduction, mutation, or crossover.

9. The system of claim 6, wherein the evaluation module maps each of the rules within the original DM and the plurality of first DMs or the plurality of second DMs to a corresponding dialogue history respectively, obtains a state diagram based on the corresponding dialogue history of each of the DMs, and compares the state diagram of each of the plurality of first DMs or the plurality of second DMs with the state diagram of the original DM to derive the evaluate score of each of the plurality of first DMs or the plurality of second DMs.

10. The system of claim 9, wherein the evaluation module compares each edge of the state diagram of each of the plurality of first DMs or the plurality of second DMs with each edge of the state diagram of the original DM to derive the evaluate score corresponding to each of the plurality of first DMs or the plurality of second DMs.

11. The system of claim 9, wherein the evaluation module derives a ratio of a complete dialogue edges set to all edges in the state diagram as the evaluate score of each of the plurality of first DMs or the plurality of second DMs.

12. The system of claim 9, wherein the DM comprises at least one control file.

13. A method for generating a dialogue manager (DM) with diversified dialogue acts for a dialogue system, wherein the dialogue system comprises a training module, an user simulation module and a storage device, the method comprising:
    generating a plurality of first DMs based on a original DM by the training module, and the plurality of first DMs are stored in the storage device;
    pre-setting the DMs for simulating user act, and generating at least one corresponding dialogue log respectively to each of the plurality of first DMs through the user simulation module of the dialogue system;
    deriving a evaluate score of the each of the plurality of first DMs by analyzing the dialogue log by the training module; and
    generating a plurality of second DMs.

14. The method of claim 13, wherein after multiple times iteration performed, a difference between the dialogue purpose of the plurality of second DMs and the dialogue purpose of the corresponding original DM is controlled under a predetermined value.

15. The method of claim 13, wherein deriving the evaluate score of the plurality of first DMs or the plurality of second DMs comprising:
    mapping rules within the original DM and the plurality of first DMs or the plurality of second DMs to a corresponding dialogue history respectively,
    obtaining a state diagram based on a corresponding dialogue status of the plurality of first DMs or the plurality of second DMs, and
    comparing the state diagram of the plurality of first DMs or the plurality of second DMs with the state diagram of the original DM to derive the evaluate score.

16. The method of claim 13, comparing each edge of the state diagram of the each of the plurality of first DMs or the plurality of second DMs with each edge of the state diagram of the original DM to derive the evaluate score.

17. The method of claim 13, wherein the evaluate score is a ratio of a complete dialogue edges set to all edges in the state diagrams of the plurality of first DMs or the plurality of second DMs.

18. The method of claim 13, wherein the DM comprises at least one control file.

* * * * *